US010045015B2

(12) United States Patent
Sichler et al.

(10) Patent No.: US 10,045,015 B2
(45) Date of Patent: Aug. 7, 2018

(54) METHOD FOR OPERATING A CAMERA AND A PROJECTOR IN A SYNCHRONIZED MANNER

(75) Inventors: Stefan Sichler, Mannheim (DE); Oliver Menken, Mannheim (DE)

(73) Assignee: VRMAGIC GMBH, Mannheim (DE)

( * ) Notice: Subject to any disclaimer, the term of this patent is extended or adjusted under 35 U.S.C. 154(b) by 352 days.

(21) Appl. No.: 14/112,113

(22) PCT Filed: Apr. 23, 2012

(86) PCT No.: PCT/EP2012/057379
§ 371 (c)(1),
(2), (4) Date: Oct. 16, 2013

(87) PCT Pub. No.: WO2012/143554
PCT Pub. Date: Oct. 26, 2012

(65) Prior Publication Data
US 2014/0043439 A1 Feb. 13, 2014

(30) Foreign Application Priority Data
Apr. 21, 2011 (DE) .................. 10 2011 018 597

(51) Int. Cl.
*H04N 13/398* (2018.01)
*H04N 13/296* (2018.01)
(Continued)

(52) U.S. Cl.
CPC .......... *H04N 13/398* (2018.05); *G01B 11/25* (2013.01); *G06T 7/521* (2017.01); *H04N 5/04* (2013.01);
(Continued)

(58) Field of Classification Search
CPC .... G01B 11/2513; G06T 7/0057; H04N 7/15; H04N 13/0497
See application file for complete search history.

(56) References Cited

U.S. PATENT DOCUMENTS

2004/0234260 A1 11/2004 Arai et al.
2005/0254726 A1 11/2005 Fuchs et al.
(Continued)

FOREIGN PATENT DOCUMENTS

DE       41 15 445 A1    1/1992
DE       197 49 435 A1   5/1999
(Continued)

OTHER PUBLICATIONS

Chen, J., et al., Research and Development of Synchronous Controller in the Three-dimensional Measurement of Moving Object, Proc. Of SPIE, vol. 7820, pp. 782020-1-782020-10, Aug. 7, 2010, XP040539013.
(Continued)

*Primary Examiner* — Zhubing Ren
(74) *Attorney, Agent, or Firm* — Hudak, Shunk & Farine Co. LPA

(57) ABSTRACT

A method for synchronizing a camera that has an image sensor with a projector that can generate a synchronization signal which corresponds to the projector frame rate. The projector is operated with a frame rate (F2), and the camera is operated with a frame rate (F1). A blanking interval is formed between individual images, and the synchronization signal of the projector is provided for controlling the camera. In order to match a phase (P1) of the frame rate (F1) of the camera to a phase (P2) of the frame rate (F2) of the projector and/or in order to match the frame rate (F1) of the camera to the frame rate (F2) of the projector, one or more blanking intervals between the individual images of the camera are varied dependent on the synchronization signal of the projector. For this purpose, a control circuit carries out a comparison between the phase (P1) of the frame rate (F1) of the camera and the phase (P2) of the frame rate (F2) of the projector and/or between the frame rate (F1) of the camera
(Continued)

Figure 1:
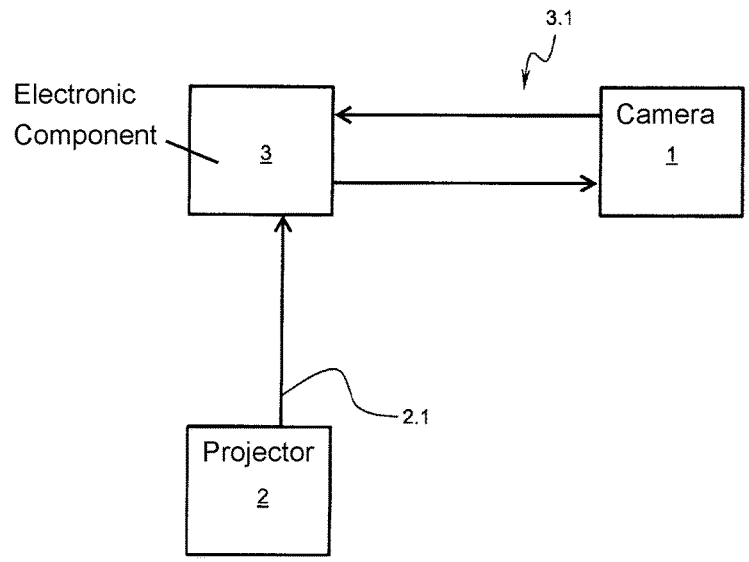

and the frame rate (F2) of the projector, wherein the trigger input of the image sensor is not activated for the matching process.

13 Claims, 2 Drawing Sheets

(51) Int. Cl.
*G01B 11/25* (2006.01)
*H04N 9/31* (2006.01)
*H04N 13/02* (2006.01)
*H04N 5/04* (2006.01)
*G06T 7/521* (2017.01)
*G02B 27/22* (2018.01)
*H04N 5/353* (2011.01)
*H04N 5/235* (2006.01)

(52) U.S. Cl.
CPC ......... *H04N 9/3176* (2013.01); *H04N 9/3179* (2013.01); *H04N 13/0253* (2013.01); *H04N 13/0296* (2013.01); *H04N 13/296* (2018.05); *G02B 27/2264* (2013.01); *H04N 5/2354* (2013.01); *H04N 5/353* (2013.01)

(56) References Cited

U.S. PATENT DOCUMENTS

| | | |
|---|---|---|
| 2007/0035650 A1 | 2/2007 | Suzuki |
| 2007/0165246 A1* | 7/2007 | Kimmel ................. 356/610 |
| 2008/0094588 A1* | 4/2008 | Cole et al. .............. 353/122 |
| 2008/0317332 A1* | 12/2008 | Ivanov ............. G01B 11/24 382/154 |
| 2012/0140096 A1* | 6/2012 | Ostlund ............ G06F 1/1639 348/241 |

FOREIGN PATENT DOCUMENTS

| | | |
|---|---|---|
| DE | 696 28 956 T2 | 5/2004 |
| DE | 10 2005 057 001 A1 | 12/2006 |
| DE | 10 2006 002 077 A1 | 7/2007 |
| DE | 10 2009 059 794 A1 | 6/2011 |
| EP | 2 182 717 A2 | 5/2010 |
| GB | 2 399 246 A1 | 9/2004 |
| WO | 2007 061632 A2 | 5/2007 |

OTHER PUBLICATIONS

Michael Kaare Rasmussen, Design and optimization of camera control on a clinical tracking system, Bachelor Thesis, pp. 1-95, Aug. 2, 2010.

* cited by examiner

Fig. 3a State of the Art

METHOD FOR OPERATING A CAMERA AND A PROJECTOR IN A SYNCHRONIZED MANNER

FIELD OF THE INVENTION

The invention relates to a method for synchronizing a camera that has an image sensor with a projector that can generate a respective synchronization signal or trigger signal which corresponds to the projector frame rate, in which the projector is operated with a frame rate F2 and the camera is operated with a frame rate F1, and wherein a blanking interval is formed between individual frames and the synchronization signal or trigger signal of the projector is provided for controlling the camera.

BACKGROUND OF THE INVENTION

For creating a 3D image, the term "structured light" means that a camera is applied together with a projector. The projector superimposes a pattern onto the scene to be recorded, and the 3D shape of the scene is determined from the geometrical analysis of this pattern. Both the camera and the projector have their own frame rates F1, F2. The projector emits the pattern at the frame rate F2 while the camera or image sensor, respectively, record individual frames, that is, expose the pixels of the image sensor, at the frame rate F1. It is important for the geometrical analysis that the respective image recorded by the camera is superimposed with the desired pattern for as long a portion of the exposure time as possible. This again requires that projector and camera are synchronized such that at least the phase response of the two frame rates F1, F2 is controlled, that is, adjusted. In this case, the two frame rates F1, F2 should at best be equal in magnitude. If not, the frame rates F1, F2 should be matched accordingly. The condition of an equal phase response would also be met if these rates were at least integer multiples of one another.

The use of non-synchronized cameras is called "free running". In this operating mode, even low-cost cameras can produce a frame rate of approx. 60 Hz up to 69 Hz, and the subsequent image readout can be performed while exposing the next frame.

But if such cameras are used in triggered operation, the frame rate drops down to 20 Hz to 30 Hz. This is due to the architecture of the processor because it first has to process exposure and then the subsequent reading out of the image before another exposure will be possible. In order to retain the original frame rate, the processor would have to be able to process the trigger signals from the projector regardless of the readout process and synchronously with exposure, which is called pipeline triggering. Processors of low-cost cameras cannot do this.

Cameras that can, for example, deliver 60 Hz in synchronized operation, that is, cameras that comprise a pipeline triggering mode, are two to three times more expensive than low-cost cameras.

A method for synchronized operation of a camera is known from the application report titled "Using the DLP Pico 2.0 Kit for Structured Light Applications" by Texas Instruments. As can be seen on page 12 there, the projector (pattern) provides a synchronization pulse (sync pulse). The synchronization pulse comprises a variable delay (sync delay). In this way, the starting point of the synchronization pulse can be changed.

The phases of the two frame rates can therefore be synchronized. However, this requires that the two frame rates are equal in size or integer multiples of one another.

DE 696 28 956 T2 discloses a method for synchronizing the recording of images by a camera and the generation of data that determine the position of the camera in a system for scanning an object and for generating data that determine points in a three-dimensional space that match the points on the surface of the object. The above method includes a scanning means that is mounted onto a multiply jointed arm for being moved by an operator and that can be used to scan an object and capture data from multiple points on the surface of the object, wherein the scanning means comprises a laser for emitting laser light onto the surface of the object and a camera for capturing the laser light reflected from the surface of the object by recording images at instants determined by a synchronization signal, said method comprising the following steps: receiving the synchronization signal for the camera, which determines the image recording instants of the camera, and the subsequent generation and output of trigger pulses to the position calculation means.

A device for three-dimensional optical measuring of objects with a topometric method of measurement in which images of projection patterns projected onto an object are recorded and evaluated is known from DE 10 2006 002 077 A1. The device includes a projector with a light source, an image recording unit and an image evaluation unit. The light source of the projector is a light arc lamp, and the image recording unit is triggered as a function of the intensity of the light arc lamp. As an alternative, the patent specification describes the operation of the recording unit in non-triggered mode, i.e. in free running mode. In this case, the light arc lamp or its current characteristics are triggered.

SUMMARY OF THE INVENTION

It is the object of the invention to design the time coordination of a camera and a projector such that as high a frame rate of the camera as possible is ensured.

This object is achieved, according to the invention, in that multiple blanking intervals between the individual frames of the camera are varied depending on the synchronization signal from the projector to match the phase P1 of the frame rate F1 of the camera and the frame rate F2 of the projector, for which purpose a control circuit compares phase P1 of the frame rate F1 of the camera and phase P2 of the frame rate F2 of the projector and/or of frame rate F1 of the camera and frame rate F2 of the projector, wherein the trigger input of the image sensor is not actuated, in this way, the starting point of the exposure of the camera or image sensor occurs simultaneously with the starting point of the projection of the projector, but neither the camera nor the image sensor must be operated in the pipeline triggering mode. As it were, the advantages of a pipeline triggering mode are modeled by the method according to the invention. The blanking interval has so far been a fixed value that depends on the exposure time and the camera frame rate applied and that separates one frame from the subsequent frame. AU that happens in the trigger mode is a change or adjustment of the pause between the starting points of each sequence of two frames. But there is no change or adjustment of the blanking interval for the purpose of matching the frame rate F1 of the image sensor or its phase P1 with that of a projector or another unit issuing a synchronization signal.

The trigger input of the camera is not used according to the invention so that the frame rate of the camera is not limited. The length of the blanking interval is set or adjusted depending on the relationship of the two frame rates F1 and F2 and/or as a function of the phase position between the two frame rates F1 and F2. A fixed setting of the length of the blanking interval, e.g. just to change the frame rate of the camera itself, is insufficient for the method according to the invention. The frame rates will diverge by nature. Comparison and subsequent matching with the frame rate F2 of the projector is important. It is also insufficient for the method according to the invention to match the phases of the frame rates F1 and F2 by means of a fixed setting of the blanking interval. Repeated checking and adjustment of the blanking interval is required to match the two phases P1 and P2 within a control loop.

It may be advantageous if the synchronization signal comprises an almost constant frequency with minor variations only. The frame rate F1 and the phase P1 can then be set to a desired setpoint value determined by the synchronization signal without any adverse deviation if the synchronization signal is strictly periodic. Otherwise the deviations between setpoint and actual values, that is, between the frame rates F1 and F2 or, above all, between the phases P1 and P2, are expected to be too great.

It can be advantageous to increase the blanking intervals in the case in which the phase P1 of the frame rate F1 of the camera is shifted toward early relative to phase P2 of the frame rate F2 of the projector and to decrease the blanking intervals in the case in which the phase P1 of the frame rate F1 of the camera is shifted toward late relative to the phase P2 of the frame rate F2 of the projector. In this way, deviation of the phases or the phase response can be countered such that on average there is as little deviation as possible. For example, as soon as the phase P1 of the frame rate F1 of the camera runs off toward late relative to the phase P2 of the frame rate F2 of the projector, the blanking interval is reduced until the two phase positions are equal again. The same applies to any shift toward early.

It may further be advantageous to increase the blanking intervals in the case in which the frame rate F1 of the camera is greater than the frame rate F2 of the projector, and/or to decrease the blanking intervals in the case in which the frame rate F1 of the camera is smaller than the frame rate F2 of the projector. The frame rate of the projector and that of the camera are typically not identical because clock-pulse generators such as quartzes do not have identical frequencies. In order to match the frame rates, especially when the frame rate F1 of the camera is greater than the frame rate F2 of the projector, the size of the blanking intervals can be varied, according to the invention, such that the frame rate F1 corresponds as closely as possible in size and in phase to the frame rate F2.

It can also be advantageous to use a camera whose frame rate F1 is greater than the frame rate F2 of the projector before the synchronization takes place. The frame rate F1 can be reduced to any size by increasing the blanking interval. But there are limits to increasing the frame rate F1 because the blanking interval cannot be reduced to any length.

It can be advantageous to capture the synchronization signal from the projector using an electronic component, a circuit or an IC and to control and/or regulate the length of the blanking intervals via an electronic component, a circuit or an IC. The IC represents the closed-loop control element because direct coupling of the camera to the synchronization signal would result in activation of the pipeline mode and in a delay of the frame rate of the camera. The closed-loop control element is used to match the setpoint and actual values reflected by the frame rate F2 or phase P2 to be assumed on the one hand and the frame rate F1 or phase P1 of the camera or image sensor to be synchronized on the other.

It may be advantageous in the equivalent case to use another camera or unit issuing a synchronization signal in addition to the projector and to adjust the frame rate F1 and/or phase P1 of the camera to its frame rate F2. The method according to the invention can therefore also be used if another camera or similar device is used as the one that issues the trigger or synchronization signal for synchronous operation of two cameras, or a camera or image sensor, respectively.

The system according to the invention provides the advantages mentioned above.

BRIEF DESCRIPTION OF THE INVENTION

Figure 2:
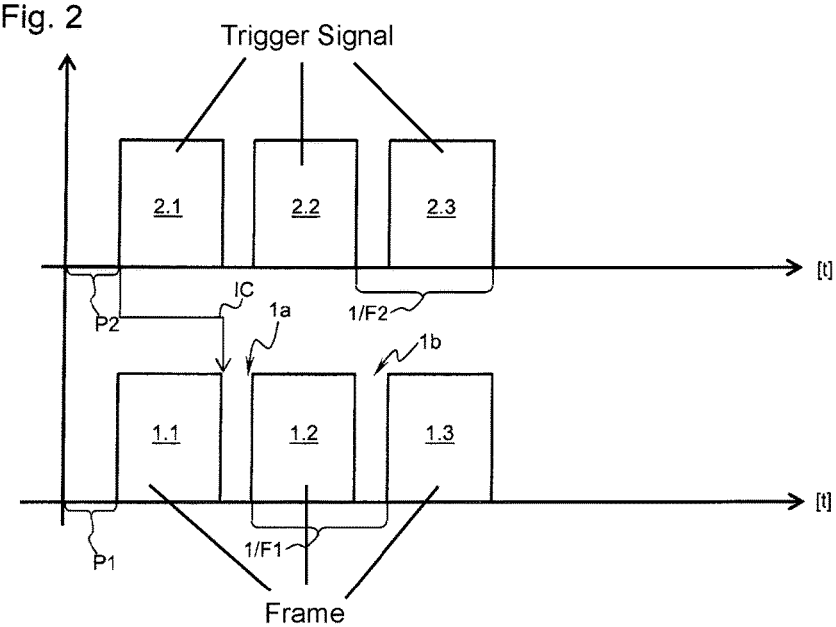
Figure 3B:
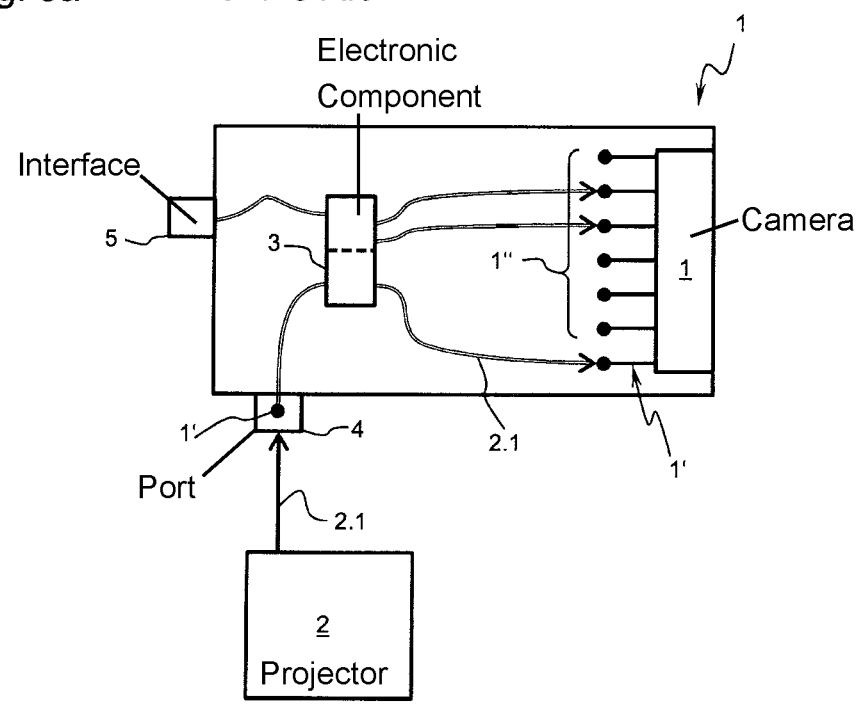
Figure 3B:
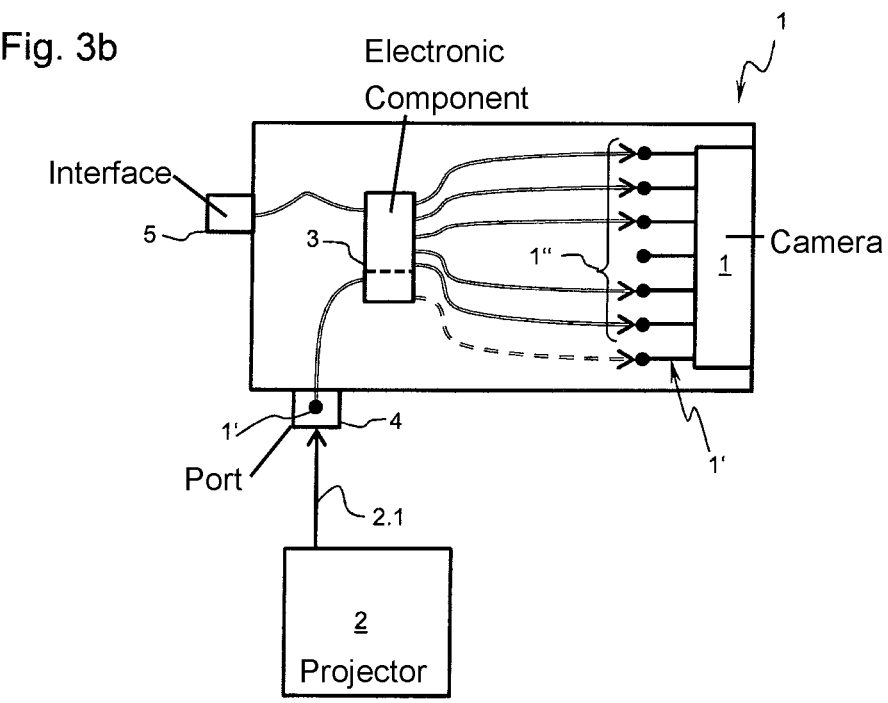

Other advantages and details of the invention are described in the patent claims and in the description and shown in the figures. Wherein:
FIG. 1 shows a circuit arrangement;
FIG. 2 shows a frequency response;
FIG. 3a represents prior art;
FIG. 3b shows a detailed view of the invention.

DETAILED DESCRIPTION OF THE INVENTION

According to the embodiment shown in FIG. 1, a camera or an image sensor 1 is coupled with a projector 2 or another camera or a unit issuing a synchronization signal via an electronic component or a closed-loop control element such as an IC 3. The projector 2 issues a trigger signal 2.1 to the IC 3. The IC 3 influences the length of a blanking interval 1a, 1b between individual frames 1.1, 1.2, 1.3 of a camera 1 via a closed-loop control circuit 3.1 such that a frame rate F1 of the camera 1 and a frame rate F2 of the projector 2 deviate as little as possible in size and/or in phase. For this purpose, a comparison is made of the frame rate F1 and the frame rate F2 as well as of the phase P1 of the camera 1 and the phase P2 of the projector 2. A deviation value A, such as A=P1−P2 or A=F1−F2, respectively, can be defined for the phase and/or the frame rate, which advantageously will not be exceeded by the closed-loop control circuit. The above comparison is an integral part of each closed-loop control.

According to FIG. 2, the projector 2 comprises a frame rate F2 at which it projects a pattern 2.1, 2.2, 2.3. The camera 1 captures or exposes the frames 1.1, 1.2, 1.3 at a frame rate F1. Phases P1, P2 of the two frame rates F1, F2 are either equalized or their phase position is minimized in that the IC 3 changes the respective blanking interval 1a, 1b. In addition, the two frame rates F1, F2 are matched. In principle, the two frame rates could differ by integer factors. For example, the frame rate F2 of the projector 2 could be twice the size of the frame rate F1 of the camera 1. In this case, one and the same frame 1.1 would be provided with two subsequent patterns 2.1, 2.2. In another case, the frame rate F2 of the projector 2 could be half the size of the frame rate F1 of the camera 1. In this case, the same pattern would be projected onto two frames 1.1, 1.2.

FIG. 3a gives a more detailed representation of prior art. The camera 1 or the image sensor 1, respectively, comprises a trigger input 1', which from a port 4 of an electronic component 3 is connected to the image sensor 1 or a control point 1" of the image sensor 1. The control point 1" or the control pin 1" forms the so-called trigger pin 1'.

In addition, the electronic component 3 may be connected to other control points 1" or control pins 1", respectively, via which a user can set the desired exposure time and optionally the frame rate of the camera or image sensor 1. The latter is performed using another interface 5, which is connected to other control points 1" or control pins 1" of the image sensor 1.

In order to generate an image, it is required that the various pixels of the image sensor 1 are exposed first and then the image as a whole is read out. The image sensor 1 needs some time to do this, depending on the desired exposure time, for example 3 ms. If a user has selected a frame rate of 10 Hz, for example (one frame every 100 ms), a pause or blanking interval of 97 ms remains between two subsequent frames. If the time needed for reading out the image is deducted, e.g. 1 ms, the blanking interval 1a is 96 ms. If the user then, for example, doubles the exposure time, 7 ms will be required for each frame, and the blanking interval 1a decreases to 93 ms.

Higher quality cameras 1 or image sensors can start exposing the next image while reading out the image, and the blanking interval 1a referenced in the above example increases to 3 ms or 6 ms, respectively.

Regular cameras 1 or image sensors can provide a higher frame rate in free running mode than in trigger mode. Frame rates drop by about one half here. Higher-end cameras 1 or image sensors, respectively, can provide equally high frame rates in free running mode and in trigger mode. This is called pipeline trigger mode. In prior art, there is no change in the blanking interval between two subsequent frames based on the exposure time selected when operating in triggered mode. As soon as a trigger signal 2.1 from a projector 2 is applied to the trigger pin 1', the image sensor generates an image based on the desired exposure time. Only when this process, i.e. exposure and reading out of the image, is completed, the image sensor or camera 1 is able to process a next pulse of the trigger signal 1.2. The image sensor does not do anything until this next pulse is received. It is in standby mode, as it were. This means that the time lag between two subsequent frames can be changed. But the blanking interval is not adjusted.

There is no change or adjustment of the blanking interval for the purpose of matching the frame rate F1 of the image sensor or its phase P1 with that of a projector or another unit that issues a synchronization signal according to prior art, neither in free running nor in trigger mode.

According to the invention and as shown in FIG. 3b, the trigger pin 1' is not in contact with the electronic component 3 despite synchronization with a synchronization signal 2.1, or at least no trigger signal 2.1 is applied to the trigger pin 1'—if it is connected to the electronic component 3. The length of the blanking interval 1a, 1b and the frame rate F1 of the camera are read out via the electronic component that is designed as a closed-loop control element 3 and the other control pins 1". Therefore the frame rate F1 and/or the phase P1 of the image sensor 1 can be compared to the frame rate F2 and/or the phase P2 of the synchronization signal 2.1 and the blanking interval 1a, 1b can be changed such that the frame rate F1 and/or the phase P1 of the image sensor 1 matches the frame rate F2 and/or the phase P2 of the synchronization signal 2.1. The camera 1 can be operated in free running mode, which means that the exposure of an image can start while the previous image is still read out, which provides a maximum frame rate.

In addition to a trigger input 1' of the camera, the interface 5 could be referenced as synchronization input 1', such that a user can already choose between the trigger mode and the synchronization mode when connecting the camera. It is important in synchronization mode that the frequency and the phase of the synchronization signal are as constant as possible, or at least show very little deviation, since otherwise it is not possible to maintain the setpoint values for the phase P1 and the frame rate F1. A trigger signal does not have to meet this requirement. In trigger mode, the camera can map any trigger signal sequence as long as it does not exceed the maximum frame rate.

LIST OF REFERENCE SYMBOLS

1 Camera, image sensor
1' Trigger input, trigger pin, synchronization input
1" Control point, control pin
1a Blanking interval
1b Blanking interval
1.1 Frame
1.2 Frame
1.3 Frame
2 Projector, other camera, unit issuing a synchronization signal
2.1 Trigger signal, synchronization signal, pattern
2.2 Trigger signal, synchronization signal, pattern
2.3 Trigger signal, synchronization signal, pattern
3 Electronic component, closed-loop control element, IC
3.1 Closed-loop control circuit
4 Port
5 Interface
F1 Frame rate of the camera
F2 Frame rate of the projector
P1 Phase of the camera
P2 Phase of the projector

What is claimed is:

1. A method for synchronizing a camera that comprises an image sensor with a projector that can generate a synchronization signal which corresponds to a projector frame rate, comprising the steps of:
   a) operating the projector that projects a pattern at a projection frame rate F2,
   b) operating the camera and capturing the projected pattern at a capture frame rate F1, wherein a blanking interval is formed/defined between individual frames, before capturing these frames,
   c) providing the synchronization signal of the projector for controlling the camera, before capturing these frames,
   d) varying one or several blanking intervals between the individual frames of the camera depending on the synchronization signal from the projector to match a phase P1 of the capture frame rate F1 of the camera and the projection frame rate F2 of the projector, in a way that a starting point of an exposure of the camera or the image sensor occurs simultaneously with a starting point of a projection of the projector, for which purpose a control circuit compares the phase P1 of the capture frame rate F1 of the camera and the phase P2 of the projection frame rate F2 of the projector and/or of the capture frame rate F1 of the camera and the projection frame rate F2 of the projector, wherein a trigger input of an image sensor is not actuated for adjusting the blanking interval.

2. The method according to claim 1, wherein the synchronization signal comprises an almost constant frequency.

3. The method according to claim 2, wherein the blanking intervals are in the case in which the phase P1 of the capture frame rate F1 of the camera is shifted toward early relative to phase P2 of the projection frame rate F2 of the projector and that the blanking intervals are decreased in the case in which the phase P1 of the capture frame rate F1 of the camera is shifted toward late relative to the phase P2 of the projection frame rate F2 of the projector.

4. The method according to claim 3, wherein the blanking intervals are increased in the case in which the capture frame rate F1 of the camera is greater than the projection frame rate F2 of the projector, and/or the blanking intervals are decreased in the case in which the capture frame rate F1 of the camera is smaller than the projection frame rate F2 of the projector.

5. The method according to claim 4, wherein a camera is used whose capture frame rate F1 is greater than the projection frame rate F2 of the projector before the synchronization takes place.

6. The method according to claim 5, wherein the synchronization signal is captured by the projector via an electronic component, a circuit, a closed-loop control circuit, or an IC and the length of the blanking intervals is controlled and/or regulated via an electronic component, a circuit, a closed-loop control circuit, or an IC.

7. The method according to claim 6, wherein another camera or unit issuing a synchronization signal is used in addition to the projector and that the capture frame rate F1 and/or phase P1 of the camera is adjusted to its projection frame rate F2.

8. The method according to claim 1, wherein the blanking intervals are in the case in which the phase P1 of the capture frame rate F1 of the camera is shifted toward early relative to phase P2 of the projection frame rate F2 of the projector and that the blanking intervals are decreased in the case in which the phase P1 of the capture frame rate F1 of the camera is shifted toward late relative to the phase P2 of the projection frame rate F2 of the projector.

9. The method according to claim 1, wherein the blanking intervals are increased in the case in which the capture frame rate F1 of the camera is greater than the projection frame rate F2 of the projector, and/or the blanking intervals are decreased in the case in which the capture frame rate F1 of the camera is smaller than the projection frame rate F2 of the projector.

10. The method according to claim 1, wherein a camera is used whose capture frame rate F1 is greater than the projection frame rate F2 of the projector before the synchronization takes place.

11. The method according to claim 1, wherein the synchronization signal is captured by the projector via an electronic component, a circuit, a closed-bop control circuit, or an IC and the length of the blanking intervals is controlled and/or regulated via an electronic component, a circuit, a closed-loop control circuit, or an IC.

12. The method according to claim 1, wherein another camera or unit issuing a synchronization signal is used in addition to the projector and that the capture frame rate F1 and/or phase P1 of the camera is adjusted to its projection frame rate F2.

13. A system for generating 3D images with a camera and a projector or another camera, which is operated using the method according to claim 1.

* * * * *